US012585295B2

(12) United States Patent
Mabuchi et al.

(10) Patent No.: US 12,585,295 B2
(45) Date of Patent: Mar. 24, 2026

(54) SOLENOID PROPORTIONAL RELIEF VALVE

(71) Applicant: NISHINA INDUSTRIAL CO., LTD.,
Nagano (JP)

(72) Inventors: Gaku Mabuchi, Nagano (JP); Shogo Koyama, Nagano (JP)

(73) Assignee: NISHINA INDUSTRIAL CO., LTD.,
Nagano (JP)

( * ) Notice: Subject to any disclaimer, the term of this patent is extended or adjusted under 35 U.S.C. 154(b) by 0 days.

(21) Appl. No.: 18/420,992

(22) Filed: Jan. 24, 2024

(65) Prior Publication Data

US 2024/0271641 A1     Aug. 15, 2024

(30) Foreign Application Priority Data

Feb. 13, 2023     (JP) ................................. 2023-019717

(51) Int. Cl.
*F16K 31/06*        (2006.01)
*F15B 13/02*        (2006.01)
*G05D 16/20*        (2006.01)

(52) U.S. Cl.
CPC ....... *G05D 16/2022* (2019.01); *F15B 13/024* (2013.01); *F16K 31/0655* (2013.01); *F15B 2211/55* (2013.01)

(58) Field of Classification Search
CPC ............ G05D 16/2022; F16K 31/0655; F16K 31/0658; F16K 17/06; F16K 1/38; F15B 13/024; H01F 2007/086
See application file for complete search history.

(56) References Cited

U.S. PATENT DOCUMENTS 3,523,676 A * 8/1970 Barker ................ F16K 31/0693
                                            251/129.05
6,050,542 A * 4/2000 Johnson .............. F16K 31/0658
                                            251/129.08
(Continued)

FOREIGN PATENT DOCUMENTS

JP          6-323451 A      11/1994
JP       2008-164068 A       7/2008
(Continued)

OTHER PUBLICATIONS

Office Action dated Jun. 17, 2025, issued in counterpart JP Application No. 2023-019717, with English translation (8 pages).
(Continued)

*Primary Examiner* — Kelsey E Cary
(74) *Attorney, Agent, or Firm* — WHDA, LLP

(57)          ABSTRACT

A solenoid proportional relief valve includes: a joint in which the flow path is disposed; a coil wound to be energized; a needle supported movably along an axial direction of the coil; and a stator generating an attraction force on the needle by excitation of the coil, the needle being formed into a bottomed cylinder having a wall portion and a bottom portion and configured as a biasing member accommodation space accommodating a biasing member in a state where a resilient force is generated in an inner cylindrical portion, an inner surface of the bottom portion being configured as a force receiving section for the biasing member, and the valve body being formed integrally with an outer surface of the bottom portion.

7 Claims, 4 Drawing Sheets

FRONT ←——→ REAR

(56)  References Cited

U.S. PATENT DOCUMENTS

| | | | | |
|---|---|---|---|---|
| 2005/0029478 A1* | 2/2005 | Komaba | ............. | F16K 31/0655 |
| | | | | 251/129.15 |
| 2007/0176136 A1* | 8/2007 | Speer | ...................... | B60T 8/363 |
| | | | | 251/321 |
| 2013/0153801 A1* | 6/2013 | Sato | ........................ | F16K 31/06 |
| | | | | 251/129.21 |
| 2014/0084197 A1* | 3/2014 | Voss | ...................... | B60T 15/028 |
| | | | | 251/129.15 |
| 2015/0130265 A1* | 5/2015 | Leventhal | ............. | B60T 13/662 |
| | | | | 251/48 |
| 2015/0137014 A1* | 5/2015 | Sato | .......................... | F16K 1/00 |
| | | | | 251/129.19 |
| 2016/0312912 A1* | 10/2016 | Nakazawa | .......... | F16K 31/0658 |
| 2017/0307101 A1* | 10/2017 | Ambrosi | ............. | F16K 31/0696 |
| 2019/0323623 A1* | 10/2019 | Mahajan | ............... | H01F 7/1607 |
| 2022/0099210 A1* | 3/2022 | Okamoto | ................ | F16K 47/02 |
| 2023/0062437 A1* | 3/2023 | Koyama | ................... | B66F 9/22 |

FOREIGN PATENT DOCUMENTS

| | | |
|---|---|---|
| JP | 2011-256951 A | 12/2011 |
| JP | 2012-112421 A | 6/2012 |

OTHER PUBLICATIONS

Office Action dated Feb. 25, 2025, issued in counterpart JP Application No. 2023-019717, with English translation. (12 pages).

* cited by examiner

FRONT ◄───► REAR

PART Ⅲ

FRONT ⟵⟶ REAR

FRONT ⟵⟶ REAR

PART V                    FRONT ⟵⟶ REAR

SOLENOID PROPORTIONAL RELIEF VALVE

CROSS-REFERENCE TO RELATED APPLICATION

This application is based upon and claims the benefit of priority of the prior Japanese Patent Application No. P2023-019717, filed on Feb. 13, 2023, and the entire contents of which are incorporated herein by reference.

TECHNICAL FIELD

The present invention relates to a solenoid proportional relief valve.

BACKGROUND ART

A working vehicle such as a forklift or a construction machine is configured with working units, such as a fork and a bucket, driven by a liquid, e.g., hydraulic oil, at predetermined pressure pressurized/delivered by a hydraulic pump. A circuit that drives the working units of this type is provided with a relief valve which performs pressure control of the liquid, that is, which opens to release a pressure when the pressure of the liquid exceeds a set value (hereinafter, also referred to as "relief pressure"), as appropriate.

As an example of the relief valve, a solenoid proportional relief valve capable of variably adjusting the relief pressure by changing a thrust of a proportional solenoid is known (refer to PTL 1: JP-A-06-323451).

SUMMARY OF INVENTION

Technical Problem

The solenoid proportional relief valve disclosed in PTL 1, compared with a conventional pilot selector type relief valve, can reduce the number of pilot pipes and pressure selecting components, realizing miniaturization, weight reduction, and simplified structure as well as manufacturing cost reduction. On the other hand, however, it is conventionally known that the solenoid proportional relief valve has a problem of tending to vibrate (chattering) during operation.

Solution to Problem

The present invention has been accomplished under the circumstances, and an object of the present invention is to provide a solenoid proportional relief valve that can realize miniaturization, weight reduction, and simplified structure and that can prevent vibration during operation to control a relief pressure accurately.

According to an aspect, the problems described above are solved by the following disclosed solutions.

A disclosed solenoid proportional relief valve is a solenoid proportional relief valve having a valve body and a valve seat mutually contacting or separating halfway in a flow path in which a liquid at a predetermined pressure flows, acting to separate the valve body from the valve seat to relieve the pressure when the pressure of the liquid in the flow path exceeds a set value, and variably adjusting the set value, the solenoid proportional relief valve including: a joint in which the flow path is disposed; a coil wound to be energized; a needle supported movably along an axial direction of the coil; and a stator generating an attraction force acting on the needle by excitation of the coil, the needle being formed into a bottomed cylinder having a wall portion and a bottom portion and configured as a biasing member accommodation space accommodating a biasing member in a state in which a resilient force is generated in an inner cylindrical portion, an inner surface of the bottom portion that is not opposed to the valve seat being configured as a force receiving section for the biasing member, and the valve body being formed integrally with an outer surface of the bottom portion opposed to the valve seat.

Furthermore, it is preferable that the needle has at least one of a through-hole communicating the inner surface of the bottom portion with the outer surface to enable the liquid to flow in the through-hole, a through-hole communicating an end surface of the wall portion opposed to the valve seat with an end surface of the wall portion that is not opposed to the valve seat to enable the liquid to flow in the through-hole, and a communication groove provided in an outer circumferential surface and communicating the end surface of the wall portion opposed to the valve seat with the end surface of the wall portion that is not opposed to the valve seat to enable the liquid to flow in the communication groove, that the valve body is formed into a shape protruding to the valve seat on the outer surface of the bottom portion, and that a mass of the needle excluding the valve body is set 30 times or more as large as a mass of the valve body.

Moreover, it is preferable that the solenoid proportional relief valve includes a holding member holding the biasing member in the biasing member accommodation space in a state of pressing the biasing member by a tip end portion to generate the resilient force, that the holding member is configured in a state in which the tip end portion is entered into the biasing member accommodation space, and configured to be able to adjust the resilient force by changing an amount of entry, and that the biasing member is held in a state of not projecting outside from within the biasing member accommodation space by the holding member.

It is also preferable that the solenoid proportional relief valve includes a tubular bobbin around which the coil is wound, that the valve seat is supported by an inner cylindrical portion of the joint fitted into an inner cylindrical portion of the bobbin, and that the needle having the valve body is slidably supported by an inner cylindrical portion of a moving support section provided in the joint or a sleeve fitted into the inner cylindrical portion of the bobbin via a bush.

It is further preferable that an axial length of the bush is set 1.2 times or more as large as an axial length of the valve body.

Advantageous Effects of Invention

According to the disclosed solenoid proportional relief valve, it is possible to prevent vibration during operation and ensure fluctuation-free and stable pressure control, i.e., accurately control the pressure of a liquid. It is also possible to realize miniaturization, weight reduction, and simplified structure.

DESCRIPTION OF EMBODIMENTS

Figure 1:
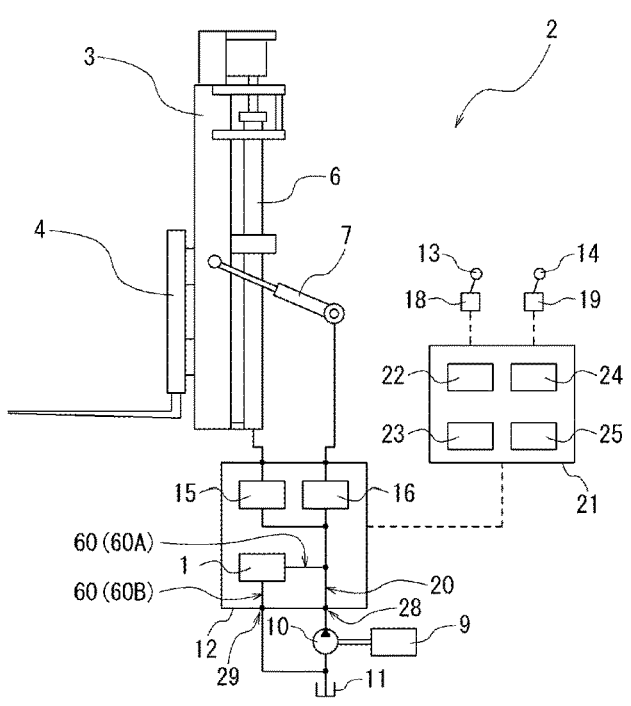
FIG. 1 is a circuit diagram illustrating an example of configurations of a circuit into which a solenoid proportional relief valve according to an embodiment of the present invention is incorporated.

An embodiment of the present invention will be described hereinafter in detail with reference to the drawings. FIG. 1 is a circuit diagram schematically illustrating an example of configurations of a circuit into which a solenoid proportional relief valve according to the embodiment of the present invention is incorporated. For the sake of convenience of description, arrows may indicate front and back directions in the drawings. In addition, members having the same function are denoted by the same reference sign and may not be repeatedly described in all the drawings for describing the embodiments.

A solenoid proportional relief valve 1 according to the present embodiment is a device incorporated into a circuit (hydraulic circuit) for a liquid at predetermined pressure (as an example of which, "hydraulic oil" will be described in the present embodiment) that drives a working unit of a working vehicle 2, and controlling the hydraulic oil, that is, setting and changing (variably adjusting) relief pressure. The relief pressure is set to, for example, approximately 2 to 40 Mpa. A "forklift" will be described hereinafter as an example of the working vehicle 2. However, the example of the working vehicle into which the solenoid proportional relief valve 1 is incorporated is not limited to this, and circuit configurations (configurations of a control valve, in particular) are not limited to the following example.

The working vehicle ("forklift" herein) 2 with circuit configurations illustrated in FIG. 1 includes a mast 3 and a fork 4 as working units driven by hydraulic oil. Furthermore, the working vehicle (forklift) 2 includes a drive source (engine or motor) 9 driving travelling units and the working units, a hydraulic pump 10 driven by this drive source 9 and delivering hydraulic oil, a tank 11 storing the hydraulic oil, a control valve 12 provided between the hydraulic pump 10 and the working units, a lift operation lever 13 operating the fork 4, and a tilt operation lever 14 operating the mast 3. The working vehicle (forklift) 2 also includes a lift operation detecting sensor 18, a tilt operation detecting sensor 19, and a controller 21.

The working vehicle 2 is provided herein with a lift cylinder 6 vertically moving the fork 4 and a tilt cylinder 7 tilting the mast 3. As specific operation, the fork 4 rises when the lift cylinder 6 is extended and the fork 4 lowers when the lift cylinder 6 is shrunk. In addition, the mast 3 tilts forward when the tilt cylinder 7 is extended and tilts rearward when the tilt cylinder 7 is shrunk.

Furthermore, the control valve 12 has a lift solenoid proportional control valve 15, a tilt solenoid proportional control valve 16, and the solenoid proportional relief valve 1.

Here, the lift solenoid proportional control valve 15 is provided between the hydraulic pump 10 and the lift cylinder 6. The lift solenoid proportional control valve 15 controls a flow rate of the hydraulic oil supplied from the hydraulic pump 10 to the lift cylinder 6 by change in an opening degree of the lift solenoid proportional control valve 15 in proportion to a control current value input to a solenoid section.

Furthermore, the tilt solenoid proportional control valve 16 is provided between the hydraulic pump 10 and the tilt cylinder 7. The tilt solenoid proportional control valve 16 controls a flow rate of the hydraulic oil supplied from the hydraulic pump 10 to the tilt cylinder 7 by change in an opening degree of the tilt solenoid proportional control valve 16 in proportion to a control current value input to a solenoid section.

On the other hand, the solenoid proportional relief valve 1 is a relief valve of a solenoid proportional type that opens when a pressure between the hydraulic pump 10 and the lift cylinder 6 or a pressure between the hydraulic pump 10 and the tilt cylinder 7 reaches a relief pressure (detailed configurations of the solenoid proportional relief valve 1 will be described later). When the solenoid proportional relief valve 1 opens, the hydraulic oil supplied from a main port 28 is delivered to a tank port 29 to release a pressure. This controls the pressure of the hydraulic oil not to exceed the relief pressure. The solenoid proportional relief valve 1 can change the relief pressure in proportion to the control current value input to the solenoid section (a proportional solenoid driving section 30 to be described later).

Next, the lift operation detecting sensor 18 detects an operation state (an operation direction and an operation amount) of the lift operation lever 13. The tilt operation detecting sensor 19 detects an operation state (an operation direction and an operation amount) of the tilt operation lever 14.

Moreover, a lift control valve control section 22 controls the lift solenoid proportional control valve 15 in response to the operation state of the lift operation lever 13 detected by the lift operation detecting sensor 18. Specifically, the lift control valve control section 22 outputs the control current value corresponding to the operation amount of the lift operation lever 13 to the solenoid section of the lift solenoid proportional control valve 15.

Furthermore, a tilt control valve control section 23 controls the tilt solenoid proportional control valve 16 in response to the operation state of the tilt operation lever 14 detected by the tilt operation detecting sensor 19. Specifically, the tilt control valve control section 23 outputs the control current value corresponding to the operation amount of the tilt operation lever 14 to the solenoid section of the tilt solenoid proportional control valve 16.

Moreover, a relief pressure setting section 24 sets the relief pressure of the solenoid proportional relief valve 1. Furthermore, a relief pressure control section 25 controls the solenoid proportional relief valve 1 in response to the relief pressure set by the relief pressure setting section 24. Specifically, the relief pressure control section 25 outputs the control current value corresponding to the set value of the pressure (relief pressure) of the hydraulic oil driving the cylinder, to the proportional solenoid driving section 30 (to be described later) of the solenoid proportional relief valve 1.

With such configurations, the solenoid proportional relief valve 1 opens (opens a branch flow path 60 to be described later) when the pressure of the hydraulic oil flowing in a line (specifically, a main flow path 20 from the hydraulic pump 10 to the lift cylinder 6 and the tilt cylinder 7) reach the set relief pressure. At this time, the hydraulic oil pumped from the hydraulic pump 10 is discharged to the tank 11 through the solenoid proportional relief valve 1.

As described above, the solenoid proportional relief valve has a problem of tending to vibrate during operation, specifically when the solenoid proportional relief valve opens/closes after the pressure of the hydraulic oil reaches the relief pressure.

Therefore, the solenoid proportional relief valve 1 according to the present embodiment can solve the problem by including the following configurations.

First, overall configurations of the solenoid proportional relief valve 1 according to the present embodiment will be described. As described above, the solenoid proportional relief valve 1 aims to control the pressure of the hydraulic oil flowing in the flow path to be controlled in the hydraulic circuit. The solenoid proportional relief valve 1 is configured as a pull-type illustrated in FIG. 2 or a push-type illustrated in FIG. 4, depending on a difference in operation.

Figure 2:
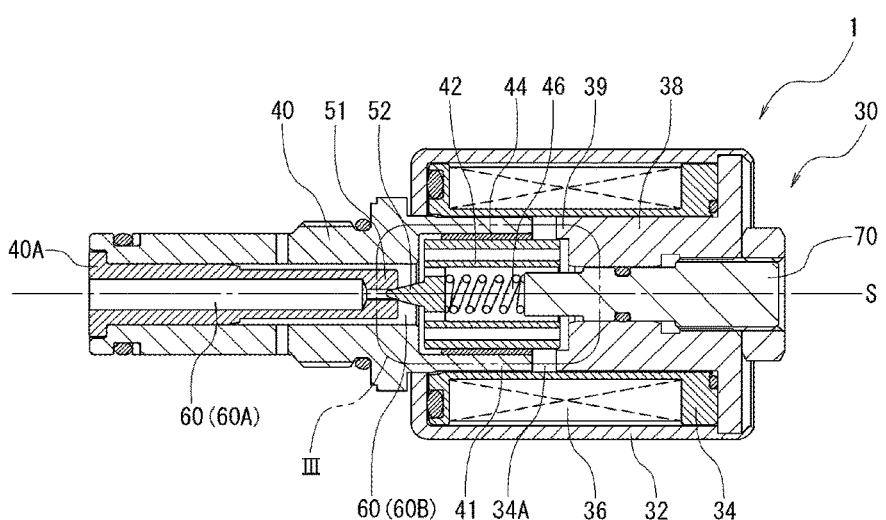
FIG. 2 is a cross-sectional front view illustrating an example of a (pull-type) solenoid proportional relief valve according to the embodiment of the present invention.
Figure 4:
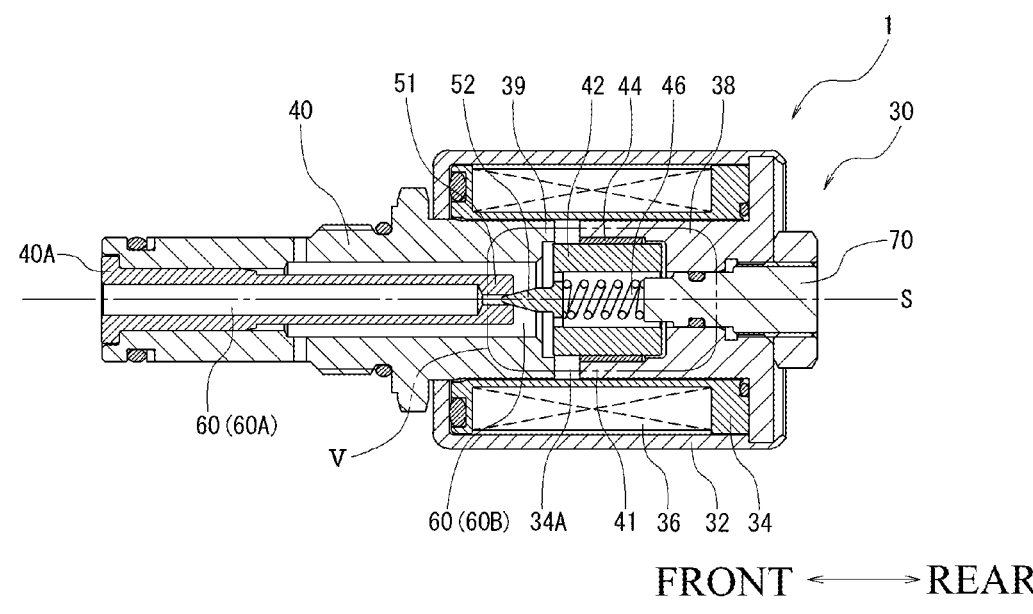
FIG. 4 is a cross-sectional front view illustrating an example of a (push-type) solenoid proportional relief valve according to the embodiment of the present invention.

As illustrated in FIGS. 2 and 4, the solenoid proportional relief valve 1 is configured with the proportional solenoid driving section 30, a sleeve 38, and a joint 40 to serve as principal sections. By way of example, the sleeve 38 is disposed on a rear end of the proportional solenoid driving section 30 (specifically a bobbin 34 to be described later) and the joint 40 is disposed on a front end thereof.

The sleeve 38 has a cylindrical shape (here, a generally cylindrical shape having a plurality of inside diameters and a plurality of outside diameters and having a flange portion and the like provided in a rear end portion). The sleeve 38 is formed with, for example, a soft magnetic material such as carbon steel or free-cutting steel. A holding member 70 to be described later is screwed into the sleeve 38.

The joint 40 has a cylindrical shape (here, a generally cylindrical shape having a plurality of inside diameters and a plurality of outside diameters and having a male screw and the like provided in an outer cylindrical portion). The joint 40 is formed with, for example, a soft magnetic material such as carbon steel or free-cutting steel. The flow path 60 in which the hydraulic oil flows is provided in the joint 40. The flow path 60 is configured as a flow path (branch flow path) branching from the flow path (main flow path) 20 in which the hydraulic oil pumped from the hydraulic pump 10 to the working units (the lift cylinder 6 and the tilt cylinder 7 in the present embodiment) via the main port 28 flows.

The flow path 60 is configured with a first flow path 60A communicating with the main port 28 that is a primary side and a second flow path 60B communicating with the tank port 29 that is a secondary side. Furthermore, a valve seat 51 and a valve body 52 that configure a valve that opens/closes the flow path 60 (i.e., changes the flow path 60 over between a communication state and a non-communication state) are provided halfway in the flow path 60, specifically in a boundary portion between the first flow path 60A and the second flow path 60B. In the present embodiment, the first flow path 60A, the second flow path 60B, and the valve seat 51 are provided in a joint inner member 40A in the joint 40. While the joint inner member 40A is formed, for example, separately from the joint 40, the joint inner member 40A may be formed integrally with the joint 40. On the other hand, the valve body 52 is provided in a needle 42 (to be described later) of the proportional solenoid driving section 30.

Next, the proportional solenoid driving section 30 is provided in a rear end portion of the joint 40, and configured with a case 32, a coil 36 wound around the bobbin 34 while insulating a long conductor member, a stator 39 that passes magnetic flux lines generated by excitation of the coil 36 to generate a magnetic force (attraction force), and the needle 42 that is attracted by the magnetic force (attraction force) generated in the stator 39 by the excitation of the coil 36 to move along an axial direction of the coil 36 (i.e., a direction along a central axis S of the coil 36 wound around the bobbin 34, the same applies hereinafter). For design purposes, the central axis S of the coil 36 coincides with central axes of various members (including the case 32, the bobbin 34, the sleeve 38, the stator 39, the joint 40, the needle 42, a bush 44, a biasing member 46, the valve seat 51, the valve body 52, and the holding member 70).

The case 32 is a tubular member (that is cylindrical here but that can be prismatic) accommodating the coil 36, the stator 39, the needle 42, and the like. The case 32 is formed with, for example, a soft magnetic material such as carbon steel or free-cutting steel.

The bobbin 34 is a tubular (cylindrical here) member having a flange portion in an end portion in a front-back direction. The bobbin 34 is formed with, for example, an insulating metal material or a resin material.

The coil 36 can be energized/non-energized with a long insulating-coated conductor member that is wound around the bobbin 34. The coil 36 is excited in an energized state and demagnetized in a non-energized state. While the conductor member is, for example, a wire rod formed to have a cross-section of a circular shape, a square shape, or the like using a copper alloy, the conductor member may be a tape material, a sheet material, or the like (not illustrated).

The stator 39 is a member generating a magnetic force (attraction force) by passing the magnetic flux lines generated by the excitation (energization) of the coil 36 to attract the needle 42 with the attraction force. For example, the stator 39 is formed with a soft magnetic material such as carbon steel or free-cutting steel.

Figure 3:
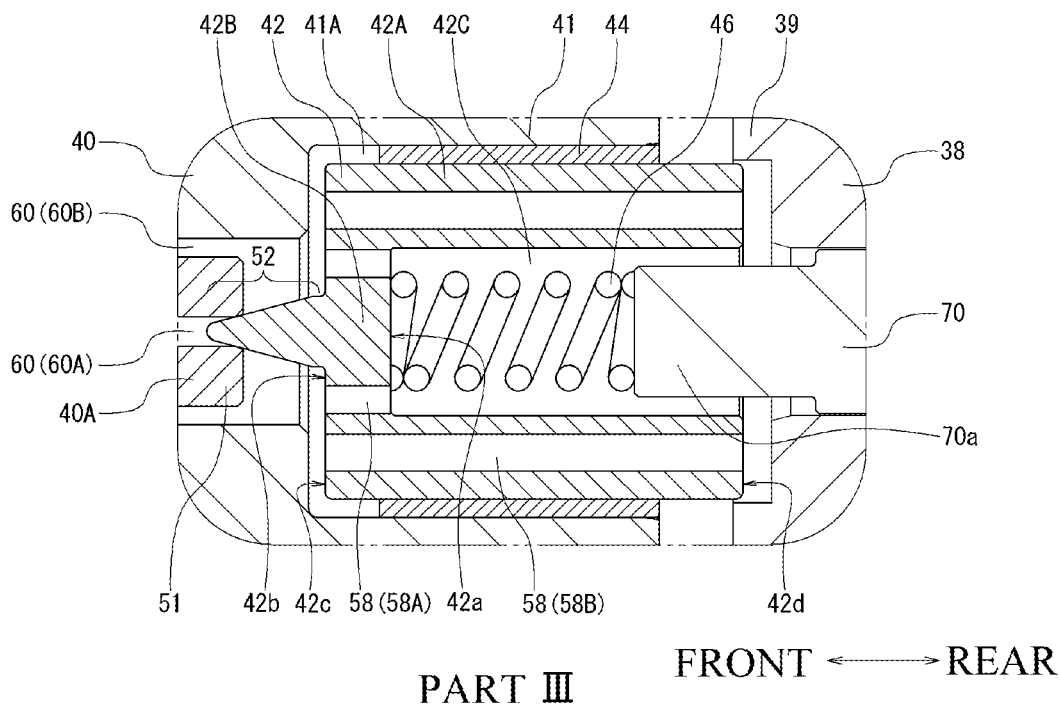
FIG. 3 is an enlarged view of part III illustrated in FIG. 2.

For the pull-type solenoid proportional relief valve 1 illustrated in FIG. 2 and FIG. 3 (the enlarged view of part III in FIG. 2), the stator 39 is provided in a front end portion of the sleeve 38. In the present embodiment, the sleeve 38 and the stator 39 are formed integrally (i.e., an integral structure formed from a material of a single member by cutting or the like). The sleeve 38 and the stator 39 may be formed separately and then fixed (not illustrated). On the other hand, for the push-type solenoid proportional relief valve 1 illustrated in FIG. 4 and FIG. 5 (the enlarged view of part V in FIG. 4), the stator 39 is provided in a rear end portion of the joint 40. In the present embodiment, the joint 40 and the stator 39 are formed integrally (i.e., an integral structure formed from a material of a single member by cutting or the like). The joint 40 and the stator 39 may be formed separately and then fixed (not illustrated).

The needle 42 is a member through which the magnetic flux lines generated when the coil 36 is excited pass and which moves along an axial direction of the coil 36 by the attraction force resulting from the magnetic flux lines and travelling to the stator 39. The needle 42 is supported in an inner cylindrical portion 41A of a moving support section 41 of a tubular shape to be axially movable via the bush 44. For example, the needle 42 is formed with a soft magnetic material such as carbon steel or free-cutting steel. In addition, the bush 44 is formed with a magnetic metal material (such as SPCC, S20C, or copper alloy, and a surface may be coated with a resin material). A thickness of the bush 44 is not specifically limited and the bush 44 may be a thin sheet (film).

For the pull-type solenoid proportional relief valve 1 illustrated in FIGS. 2 and 3, the moving support section 41 is provided in the rear end portion of the joint 40. In the present embodiment, the joint 40 and the moving support section 41 are formed integrally (i.e., an integral structure formed from a material of a single member by cutting or the like). The joint 40 and the moving support section 41 may be formed separately and then fixed (not illustrated). On the other hand, for the push-type solenoid proportional relief valve 1 illustrated in FIGS. 4 and 5, the moving support section 41 is provided in the front end portion of the sleeve 38. In the present embodiment, the sleeve 38 and the moving support section 41 are formed integrally (i.e., an integral structure formed from a material of a single member by cutting or the like). The sleeve 38 and the moving support section 41 may be formed separately and then fixed (not illustrated).

Whether the pull-type (FIGS. 2 and 3) or the push-type (FIGS. 4 and 5), the needle 42 is formed into a bottomed cylinder having a wall portion 42A and a bottom portion 42B, and an inner cylindrical portion 42C is configured as a biasing member accommodation space in which the biasing member 46 is accommodated. Furthermore, for the needle 42, an inner surface 42a of the bottom portion 42B that is not opposed to the valve seat 51 is configured as a force receiving portion of the biasing member 46 (region receiving a biasing force). The valve body 52 is formed integrally on an outer surface 42b of the bottom portion 42B opposed to the valve seat 51 (i.e., formed integrally with the needle 42 from a single member). The configurations contribute to a reduction in manufacturing cost by reducing the number of components and assembly man-hours. It is noted that the biasing member 46 may be engaged directly with the force receiving section 42a as in the present embodiment or may be engaged by a spacer (not illustrated) or the like disposed between the biasing member 46 and the force receiving section 42a.

As described above, the valve seat 51 is supported by the inner cylindrical portion of the joint 40 fitted into an inner cylindrical portion 34A of the bobbin 34. On the other hand, the needle 42 having the valve body 52 is slidably supported by the inner cylindrical portion 41A of the moving support section 41 via the bush 44. For the pull-type (FIGS. 2 and 3), the moving support section 41 is provided in the joint 40 fitted into the inner cylindrical portion 34A of the bobbin 34. For the push-type (FIGS. 4 and 5), the moving support section 41 is provided in the sleeve 38 fitted into the inner cylindrical portion 34A of the bobbin 34. With these configurations, a supporting member (the inner cylindrical portion 34A of the bobbin 34) is commonly used to enable the central axis of the valve seat 51 to coincident with the central axis of the valve body 52 precisely. Therefore, it is possible to prevent vibration generated during operation (opening/closing) due to slight misalignment of the mutual central axes.

As a specific example of configurations, it is preferable that an axial length of the bush 44 is set 1.2 times or more as large as an axial length of the valve body 52. Above settings can precisely maintain linearity during movement of the valve body 52 and prevent a failure of the vibration of the valve body 52 during the movement of the valve body 52 (during opening/closing the valve).

Next, the biasing member 46 is formed with, for example, a coil spring made of a non-magnetic metal material (such as stainless alloy). The biasing member 46 acts to bias the valve body 52 toward the valve seat 51 along the axial direction by a resilient force (biasing force) thereof to press-contact the valve body 52 with the valve seat 51. It is noted that the biasing member 46 is not limited to the coil spring and may be the other spring (such as an air spring, not illustrated).

In the present embodiment, the solenoid proportional relief valve 1 includes the holding member 70 that holds the biasing member 46 in the biasing member accommodation space 42C with the biasing member 46 pressed by a tip end portion 70a to generate a resilient force (biasing force). That is, the biasing member 46 is put between the holding member 70 (tip end portion 70a) and the force receiving section 42a, generating a resilient force in the biasing member 46. The holding member 70 is rotatably screwed into an inner cylindrical portion of the sleeve 38 and disposed with the tip end portion 70a entering into the biasing member accommodation space 42C.

Therefore, an initial set value of the relief pressure in the solenoid proportional relief valve 1 is set by the resilient force of the biasing member 46, and the biasing member 46 can be adjusted by rotating the holding member 70 (specifically changing an amount of entry of the tip end portion 70a.) This can eliminate the influence of a difference among individual biasing members 46 and ensure accurate pressure setting and adjustment.

Moreover, the holding member 70 holds the biasing member 46 in a state in which the biasing member 46 does not project outside from within the biasing member accommodation space 42C (i.e., in a state in which the biasing member 46 is accommodated near the bottom portion 42B rather than a second end surface 42d. This can configure the solenoid proportional relief valve 1 smaller (shorter) particularly in axial dimensions.

The solenoid proportional relief valve 1 having the configurations above exhibit the following effects. In a state of exciting the coil 36, the stator 39 generates an attraction force for the needle 42. Therefore, a propulsive force (force to move) is generated in the needle 42 by the attraction force. As a result, an effect is produced that changes (adds or reduces) the resilient force (biasing force) of the biasing member 46. On the other hand, in a state of demagnetizing the coil 36, the stator 39 does not generate the attraction force for the needle 42. Therefore, the propulsive force (force to move) by the attraction force is not generated in the needle 42. As a result, the effect is not produced that changes the resilient force (biasing force) of the biasing member 46. The solenoid proportional relief valve 1 according to the present embodiment is a so-called proportional solenoid. Therefore, changing (adding or reducing) the control current value, i.e., the current value for exciting the coil 36 (for setting an excitation strength) enables the attraction force on the needle 42 by the stator 39, i.e., the propulsive force of the needle 42 to be changed (an amount of change of the propulsive force is proportional to the current value). As a result, changing (adding or reducing) the resilient force (biasing force) of the biasing member 46 can change the force of press contact between the valve body 52 and the valve seat 51. That is, changing the current value can variably adjust the relief pressure of the hydraulic oil (set the relief pressure to any value within a design range).

Specifically, for the pull-type solenoid proportional relief valve 1 (FIGS. 2 and 3), the attraction force of the stator 39 generates the propulsive force in a attraction direction (i.e., a direction of moving rearward along the axial direction) is generated in the needle 42 in the state of exciting the coil 36. This propulsive force acts in an opposite direction to the resilient force (biasing force) of the biasing member 46. For example, as the current value of the coil 36 increases, the attraction force increases. For that reason, the propulsive force of the needle 42 acting in the opposite direction to the resilient force (biasing force) of the biasing member 46 (i.e., subtracting the resilient force) increases. Therefore, the set value of the relief pressure can be reduced. That is, the set value of the relief pressure falls in proportion to the current value of the coil 36. For the current value of zero, the relief pressure is the initial set value set only by the resilient force (biasing force) of the biasing member 46.

On the other hand, for the push-type solenoid proportional relief valve 1 (FIGS. 4 and 5), the attraction force of the stator 39 generates the propulsive force in the attraction direction (i.e., the direction of moving forward along the axial direction) is generated in the needle 42 in the state of exciting the coil 36. This propulsive force acts in the same direction as the resilient force (biasing force) of the biasing member 46. For example, as the current value of the coil 36 increases, the attraction force increases. For that reason, the propulsive force of the needle 42 acting in the same direction as the resilient force (biasing force) of the biasing member 46 (i.e., adding the resilient force) increases. Therefore, the set value of the relief pressure can be increased. That is, the set value of the relief pressure rises in proportion to the current value of the coil 36. For the current value of zero, the relief pressure is the initial set value set only by the resilient force (biasing force) of the biasing member 46.

Figure 5:
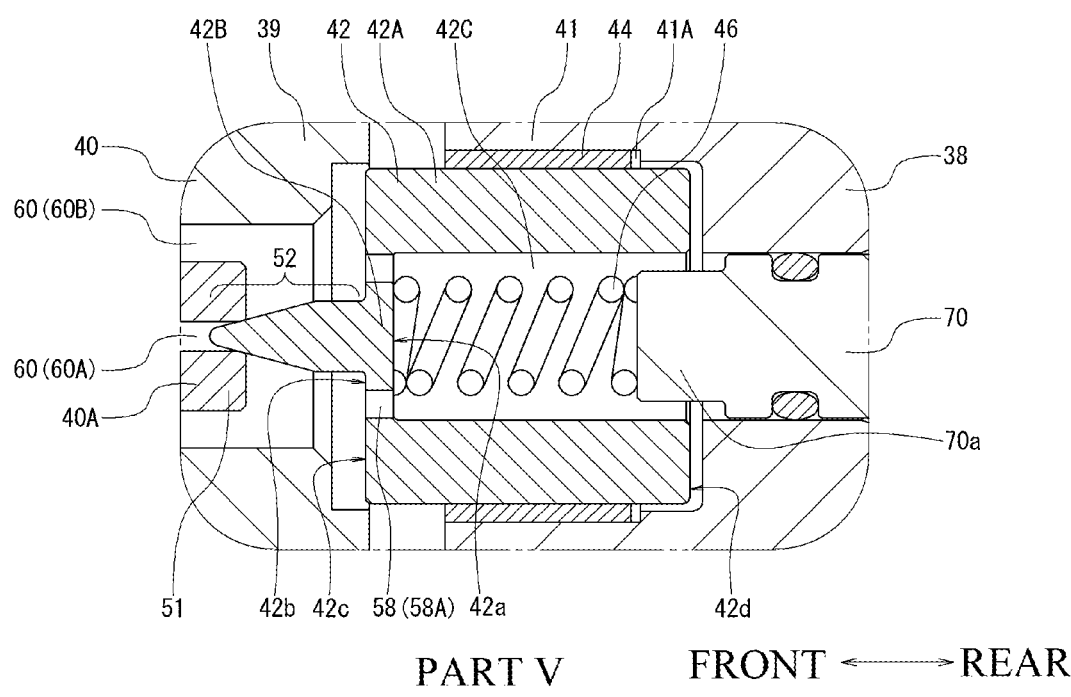
FIG. 5 is an enlarged view of part V illustrated in FIG. 4.

The solenoid proportional relief valve 1 according to the present embodiment can prevent the failure of the vibration of the valve body 52 during operation (during opening/closing the valve 1), whether the pull-type (FIGS. 2 and 3) or the push-type (FIGS. 4 and 5). According to the study of the inventors of the present application, this is because the configurations of integrally forming the valve body 52 and the needle 42 are a significant contribution. Specifically, compared with the conventional solenoid proportional relief valve, it is considered that the extreme (great) increase in the mass of the configurations acting as the valve body 52 can realize configurations of settling in eigen frequency band in which the vibration is suppressed.

As a specific example of configurations, the needle 42 is set so that the mass of the needle 42 except for the valve body 52 is preferably 30 times or more (more preferably, 50 times or more) as large as the mass of the valve body 52 in a state in which predetermined through-holes 58, to be described later, are formed. The study of the inventors of the present application validated that the above settings can produce the effect of preventing the occurrence of the failure of the vibration of the valve body 52.

Figure 6:
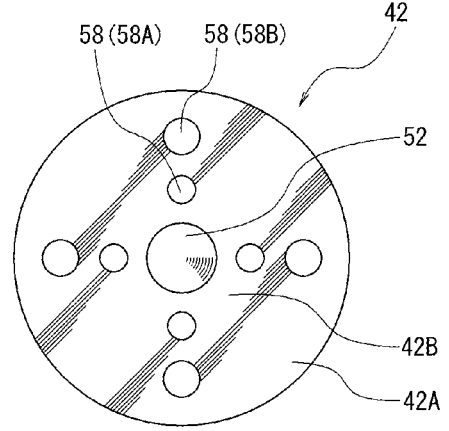
FIG. 6 is a side view illustrating an example of a needle of the solenoid proportional relief valve according to the embodiment of the present invention.
Figure 7:
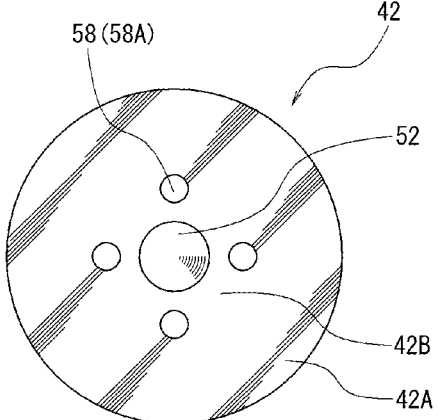
FIG. 7 is a side view illustrating another example of the needle of the solenoid proportional relief valve according to the embodiment of the present invention.

Furthermore, as an example of configurations applicable to both the pull-type (FIGS. 2 and 3) and the push-type (FIGS. 4 and 5), the needle 42 is preferably configured with a plurality of (e.g., four) through-holes 58 (first through-holes 58A) that communicate the inner surface 42*a* of the bottom portion 42B with the outer surface 42*b* to enable the flow of the hydraulic oil and that are provided equidistantly in circumferential direction. Moreover, the needle 42 is preferably configured with a plurality of (e.g., four) through-holes 58 (second through-holes 58B) that communicate an end surface (first end surface) 42*c* of the wall portion 42A opposed to the valve seat 51 with the end surface (second end surface) 42*d* of the wall portion 42A not opposed to the valve seat 51 to enable the flow of the hydraulic oil and that are provided equidistantly in the circumferential direction. Specifically, the needle 42 may be configured with the first through-holes 58A and the second through-holes 58B as the through-holes 58 as illustrated in FIGS. 3 and 6 (the side view of the needle 42 illustrated in FIG. 3), or may be configured without one type of through-holes 58 (the second through-holes 58B) as illustrated in FIGS. 5 and 7 (the side view of the needle 42 illustrated in FIG. 5). Although not illustrated, the needle 42 may be configured without the first through-holes 58A. The numbers of the first through-holes 58A and the second through-holes 58B are not limited to those described above.

Figure 8:
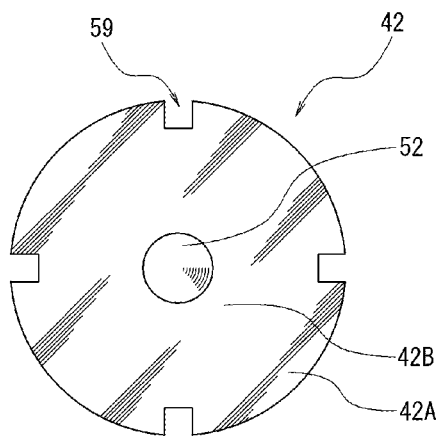
FIG. 8 is a side view illustrating yet another example of the needle of the solenoid proportional relief valve according to the embodiment of the present invention.

The configurations can prevent a difference in pressure between front and rear surfaces of the needle 42 (i.e., a difference between the pressure of the hydraulic oil acting on the front surface (including the outer surface 42*b* of the bottom portion 42B and the end surface 42*c* of the wall portion 42A) and that acting on the rear surface (including the inner surface 42*a* of the bottom portion 42B and the end surface 42*d* of the wall portion 42A). This can prevent unstable operation caused by the difference in pressure, and, therefore, control the relief pressure quite accurately. As a modification, the needle 42 may be configured with a communication groove 59 (refer to FIG. 8) communicating with the outer circumferential surface of the needle 42 in the front-back direction (specifically, communicating the first end surface 42*c* with the second end surface 42*d*) as an alternative to the through-holes 58 (or together with the through-holes 58). This modification can produce similar advantages and effects.

As described so far, the disclosed solenoid proportional relief valve can prevent vibration during operation and realize fluctuation-free and stable pressure control, i.e., high precision control over the relief pressure of the liquid described as the hydraulic oil herein. It is also possible to realize miniaturization, weight reduction, and simplified structure.

Needless to say, the present invention is not limited to the embodiment described so far and can be changed and modified in various manners without departing from the present invention. While the hydraulic circuit that drives the working units in the working vehicle has been particularly described as an example of the subject into which the solenoid proportional relief valve is incorporated, the subject is not limited to this hydraulic circuit.

What is claimed is:

1. A solenoid proportional relief valve having a valve body and a valve seat mutually contacting or separating halfway in a flow path in which a liquid at a predetermined pressure flows, acting to separate the valve body from the valve seat to relieve the pressure when the pressure of the liquid in the flow path exceeds a set value, and variably adjusting the set value, the solenoid proportional relief valve comprises:
    a joint in which the flow path is disposed;
    a coil wound to be energized;
    a needle supported movably along an axial direction of the coil; and
    a stator generating an attraction force acting on the needle by excitation of the coil,
wherein the needle is formed into a bottomed cylinder having a wall portion and a bottom portion and configured as a biasing member accommodation space accommodating a biasing member in a state in which a resilient force is generated in an inner cylindrical portion, an inner surface of the bottom portion that is not opposed to the valve seat is configured as a force receiving section for the biasing member, and the valve body is formed integrally with an outer surface of the bottom portion opposed to the valve seat,
wherein the needle has (i) a through-hole communicating the inner surface of the bottom portion with the outer surface to enable the liquid to flow in the through-hole, (ii) a through-hole communicating an end surface of the wall portion opposed to the valve seat with an end surface of the wall portion that is not opposed to the valve seat to enable the liquid to flow in the through-hole, or (iii) a communication groove provided in an outer circumferential surface and communicating the end surface of the wall portion opposed to the valve seat with the end surface of the wall portion that is not opposed to the valve seat to enable the liquid to flow in the communication groove, wherein the valve body is formed into a shape protruding to the valve seat on the outer surface of the bottom portion, and wherein a mass of the needle excluding the valve body is set 30 times or more as large as a mass of the valve body, wherein the solenoid proportional relief valve comprises a tubular bobbin around which the coil is wound, wherein the valve seat is supported by an inner cylindrical portion of the joint fitted into an inner cylindrical portion of the bobbin, wherein the needle having the valve body is slidably supported by an inner cylindrical portion of a moving support section provided in the joint or a sleeve fitted into the inner cylindrical portion of the bobbin via a bush, and an axial length of the bush is set 1.2 times or more as large as an axial length of the valve body.

2. A solenoid proportional relief valve having a valve body and a valve seat mutually contacting or separating halfway in a flow path in which a liquid at a predetermined pressure flows, acting to separate the valve body from the valve seat to relieve the pressure when the pressure of the liquid in the flow path exceeds a set value, and variably adjusting the set value, the solenoid proportional relief valve comprises:

a joint in which the flow path is disposed;

a coil wound to be energized;

a needle supported movably along an axial direction of the coil; and a stator generating an attraction force acting on the needle by excitation of the coil, wherein the needle is formed into a bottomed cylinder having a wall portion and a bottom portion and configured as a biasing member accommodation space accommodating a biasing member in a state in which a resilient force is generated in an inner cylindrical portion, an inner surface of the bottom portion that is not opposed to the valve seat is configured as a force receiving section for the biasing member, and the valve body is formed integrally with an outer surface of the bottom portion opposed to the valve seat, wherein the solenoid proportional relief valve comprises a tubular bobbin around which the coil is wound, wherein the valve seat is supported by an inner cylindrical portion of the joint fitted into an inner cylindrical portion of the bobbin, wherein the needle having the valve body is slidably supported by an inner cylindrical portion of a moving support section provided in the joint or a sleeve fitted into the inner cylindrical portion of the bobbin via a bush, and an axial length of the bush is set 1.2 times or more as large as an axial length of the valve body.

3. The solenoid proportional relief valve according to claim 2, wherein the solenoid proportional relief valve comprises a holding member holding the biasing member in the biasing member accommodation space in a state of pressing the biasing member by a tip end portion to generate the resilient force, wherein the holding member is configured in a state in which the tip end portion is entered into the biasing member accommodation space, and configured to be able to adjust the resilient force by changing an amount of entry, and wherein the biasing member is held in a state of not projecting outside from within the biasing member accommodation space by the holding member.

4. The solenoid proportional relief valve according to claim 2, wherein the needle has (i) a through-hole communicating the inner surface of the bottom portion with the outer surface to enable the liquid to flow in the through-hole.

5. The solenoid proportional relief valve according to claim 2, wherein the needle has (ii) a through-hole communicating the end surface of the wall portion opposed to the valve seat with the end surface of the wall portion that is not opposed to the valve seat to enable the liquid to flow in the through-hole.

6. The solenoid proportional relief valve according to claim 2, wherein the needle has (i) a through-hole communicating the inner surface of the bottom portion with the outer surface to enable the liquid to flow in the through-hole and (ii) a through-hole communicating the end surface of the wall portion opposed to the valve seat with the end surface of the wall portion that is not opposed to the valve seat to enable the liquid to flow in the through-hole.

7. The solenoid proportional relief valve according to claim 2, wherein the needle has (iii) a communication groove provided in the outer circumferential surface and communicating the end surface of the wall portion opposed to the valve seat with the end surface of the wall portion that is not opposed to the valve seat to enable the liquid to flow in the communication groove.

* * * * *